(12) United States Patent
Simmons et al.

(10) Patent No.: US 10,378,447 B2
(45) Date of Patent: Aug. 13, 2019

(54) SYSTEM AND METHOD FOR PURGING FUEL OR COOLANT FROM TURBOMACHINE

(71) Applicant: General Electric Company, Schenectady, NY (US)

(72) Inventors: James Arthur Simmons, Tampa, FL (US); Octavio Augusto Castillo Morales, Santiago de Querétaro (MX); Victor Alfonso Gonzalez Tellez, Santiago de Querétaro (MX)

(73) Assignee: General Electric Company, Schenectady, NY (US)

( * ) Notice: Subject to any disclaimer, the term of this patent is extended or adjusted under 35 U.S.C. 154(b) by 159 days.

(21) Appl. No.: 15/282,621

(22) Filed: Sep. 30, 2016

(65) Prior Publication Data

US 2018/0094586 A1 Apr. 5, 2018

(51) Int. Cl.
*F02C 3/30* (2006.01)
*F02C 7/143* (2006.01)
*F02C 7/22* (2006.01)
*F02C 7/16* (2006.01)
*F02C 7/232* (2006.01)

(52) U.S. Cl.
CPC ......... *F02C 7/222* (2013.01); *F02C 7/16* (2013.01); *F02C 7/232* (2013.01); *F02C 3/30* (2013.01); *F02C 7/1435* (2013.01); *F05D 2220/32* (2013.01); *F05D 2260/212* (2013.01); *F05D 2260/601* (2013.01); *F05D 2260/602* (2013.01)

(58) Field of Classification Search
CPC .. F02C 7/22; F02C 7/222; F02C 7/224; F02C 7/228; F02C 7/232; F02C 7/236; F02C 7/1435; F02C 3/30; F02C 3/305; F02C 3/32; F05D 2260/601; F05D 2260/602; F23K 2301/203; F23D 2290/30; F23N 2027/04; F23N 2027/06
See application file for complete search history.

(56) References Cited

U.S. PATENT DOCUMENTS 3,810,714 A * 5/1974 Turner .................. F02C 7/22
 417/182.5
3,841,089 A * 10/1974 Clark .................. F02C 7/232
 137/202
3,901,025 A * 8/1975 Bryerton .............. F02C 7/22
 60/39.094

(Continued)

FOREIGN PATENT DOCUMENTS

CN 101210519 A 10/1999
EP 0949454 A2 5/2007

(Continued)

OTHER PUBLICATIONS

Chinese Office Action, dated Aug. 18, 2015; Application No. 201210445683.2; 15 pages, which includes the translation.

(Continued)

*Primary Examiner* — William H Rodriguez
(74) *Attorney, Agent, or Firm* — Fletcher Yoder, P.C.

(57) ABSTRACT

Systems and methods include one or more fluid lines configured to flow a fluid in a first direction in the gas turbine system. The systems and methods also include an eductor configured to reverse flow of the fluid in the one or more fluid lines during a reverse purge of the gas turbine system.

20 Claims, 4 Drawing Sheets

(56) References Cited

U.S. PATENT DOCUMENTS

| | | | |
|---|---|---|---|
| 4,449,359 A | | 5/1984 | Cole et al. |
| 4,539,809 A | * | 9/1985 | Stanley .................. F02C 7/232 |
| | | | 60/39.094 |
| 4,893,467 A | | 1/1990 | Woodson |
| 4,969,324 A | | 11/1990 | Woodson |
| 5,369,951 A | | 12/1994 | Corbett et al. |
| 5,540,045 A | | 7/1996 | Corbett et al. |
| 5,720,164 A | | 2/1998 | Corbett et al. |
| 5,865,024 A | | 2/1999 | Kress et al. |
| 6,145,294 A | * | 11/2000 | Traver ..................... F23K 5/18 |
| | | | 60/39.094 |
| 6,250,065 B1 | | 6/2001 | Mandai et al. |
| 6,367,239 B1 | | 4/2002 | Brown et al. |
| 6,393,827 B1 | | 5/2002 | Nakamoto |
| 6,438,963 B1 | | 8/2002 | Traver et al. |
| 6,442,925 B1 | | 9/2002 | Dalton et al. |
| 6,523,346 B1 | * | 2/2003 | Hoffmann ............... F01K 23/10 |
| | | | 60/646 |
| 7,007,452 B1 | | 3/2006 | Baryshnikov et al. |
| 7,770,400 B2 | | 8/2010 | Iasillo et al. |
| 8,340,886 B2 | | 12/2012 | Nenmeni et al. |
| 2003/0046938 A1 | * | 3/2003 | Mortzheim ........... F01D 17/105 |
| | | | 60/782 |
| 2003/0121269 A1 | | 7/2003 | Mick et al. |
| 2005/0279079 A1 | * | 12/2005 | Baryshnikov ........... F02C 7/232 |
| | | | 60/39.094 |
| 2006/0137356 A1 | * | 6/2006 | Jimenez Haertel ... F02C 7/1435 |
| | | | 60/775 |
| 2006/0144046 A1 | * | 7/2006 | Vetrovec ................. F02B 33/40 |
| | | | 60/605.1 |
| 2006/0277912 A1 | * | 12/2006 | Shibata ..................... F02C 3/30 |
| | | | 60/728 |
| 2007/0101723 A1 | | 5/2007 | Kunkle et al. |
| 2008/0154474 A1 | | 6/2008 | Iasillo et al. |
| 2009/0025396 A1 | | 1/2009 | Joshi et al. |
| 2009/0320478 A1 | * | 12/2009 | Head ........................ F04F 5/16 |
| | | | 60/657 |
| 2011/0036092 A1 | | 2/2011 | Lawson et al. |
| 2011/0052377 A1 | * | 3/2011 | Chamoto .................. F02C 7/04 |
| | | | 415/180 |
| 2011/0265488 A1 | | 11/2011 | Lawson et al. |
| 2012/0167547 A1 | | 7/2012 | Zhang et al. |
| 2013/0098040 A1 | | 4/2013 | Zhang et al. |
| 2013/0098056 A1 | | 4/2013 | Zhang et al. |
| 2013/0118178 A1 | | 5/2013 | Sabelhaus et al. |
| 2013/0323089 A1 | | 12/2013 | Han |
| 2014/0013754 A1 | | 1/2014 | Slobodyanskiy et al. |
| 2015/0030438 A1 | * | 1/2015 | Takahashi .............. F04D 29/083 |
| | | | 415/159 |
| 2015/0377133 A1 | * | 12/2015 | Kanebako ................. F02C 3/30 |
| | | | 60/39.54 |
| 2016/0040915 A1 | * | 2/2016 | Jonsson .................. F25B 1/053 |
| | | | 62/498 |
| 2016/0186671 A1 | * | 6/2016 | Austin ...................... F02C 3/24 |
| | | | 60/737 |

FOREIGN PATENT DOCUMENTS

| | | | | |
|---|---|---|---|---|
| EP | | 1783347 A2 | 5/2007 | |
| EP | | 3037730 A2 | 6/2016 | |
| JP | | H11210494 A | 8/1999 | |
| WO | WO | 0116472 A1 | * 3/2001 | ............. F02C 7/232 |

OTHER PUBLICATIONS

Extended European Search Report and Opinion issued in connection with corresponding EP Application No. 17192364.2 dated Jun. 7, 2018.

* cited by examiner

SYSTEM AND METHOD FOR PURGING FUEL OR COOLANT FROM TURBOMACHINE

BACKGROUND

The subject matter disclosed herein relates to turbomachinery, such as gas turbine engines with one or more fluid flows. More particularly, the present disclosure relates to a reverse purge system for purging fluid (e.g., gas fuel, liquid fuel, water) from a turbomachine, such as a gas turbine engine Fluids may remain in the turbomachine resulting in undesired operation. For example, in turbomachines, after delivery of fuel to combustors, residual fuel may remain in fuel manifolds and/or fuel premixers sticking to internal walls or surfaces of the fuel premixers. Residual fuel may form deposits that could obstruct fuel flow through the premixers. Unfortunately, the residual fuel can cause clogging of the fuel premixers and/or manifolds, or passages extending between the fuel premixers and the manifolds. Moreover, fluid may be wasted by remaining in the system. In some cases, the fluid remaining in the turbomachine may be purged from the turbomachine using an inert gas, but forward purging may cause a relatively high disturbance in operation of the turbomachine due to the purge (e.g., vibration).

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the invention may encompass a variety of forms that may be similar to or different from the embodiments set forth below.

In a first embodiment, a gas turbine system includes one or more fluid lines configured to flow a fluid in a first direction in the gas turbine system. The gas turbine system also includes an eductor configured to reverse flow of the fluid in the one or more fluid lines during a reverse purge of the gas turbine system.

In a second embodiment, a gas turbine system includes a shaft, a compressor coupled to the shaft and configured to compress ambient air for a mixture of air and liquid fuel, and a combustor configured to receive the mixture from the compressor and consume the fuel to generate rotational force on the shaft via a turbine. The gas turbine system also includes one or more fluid lines configured to flow a fluid in a first direction into the compressor or the combustor. Furthermore, the gas turbine system includes an eductor configured to reverse flow of the fluid in the one or more fluid lines during a reverse purge of the gas turbine system.

In a third embodiment, a method includes supplying fluid to a gas turbine using one or more fluid lines in a first direction during operation of the gas turbine. The method also includes, during a purge of the gas turbine, reversing flow in the one or more fluid lines from the first direction to a second direction to drain the fluid from the gas turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are directed to turbomachines and fluid reverse purging systems for turbomachines, such as gas turbine engines. In particular, present embodiments are directed to a system for purging fluid (e.g., gas fuel, liquid fuel, water, etc.) from one or more portions of the turbomachine (e.g., fuel manifold, fuel premixer, pipe, nozzle, etc.). For example, one or more combustors of the turbomachine combust one or more fuels with an oxidant, such as air or oxygen. A fuel manifold and one or more fuel premixers (which may be parts of fuel nozzles) deliver the fuel to the one or more combustors. For example, the fuel manifold distributes fuel to the fuel premixers, which may mix the fuel with air (e.g., oxygen). The fuel or fuel-air mixture reacts within the combustors to produce combustion products.

In some embodiments, one or more fuel premixers distribute a pilot fuel to the combustors for an ignition portion (and/or startup portion) of the combustion process (e.g., while the gas turbine is in startup mode). Then, fuel premixers distribute a burn fuel to continue the combustion process (e.g., to transition the gas turbine from the startup mode to a steady state mode). The pilot fuel and the burn fuel may be different, and each fuel may be configured to enhance efficiency of their respective portions of the combustion process (e.g., startup and steady state modes of the gas turbine). In some embodiments, a first fuel manifold may distribute the pilot fuel to the fuel premixers, and a second fuel manifold may distribute the burn fuel to the fuel premixers. In other embodiments, a single type of fuel may be used for the duration of the combustion process. In either configuration, it may be desirable to purge residual fuel in the fuel manifold, fuel premixers, or fuel passageways extending between the fuel manifold and fuel premixers after delivering the fuel to the combustors, such as during shut down or maintenance intervals, or when the portions of the gas turbine directed to delivering fuel are not being used (e.g., after transition from startup to steady state) but still during operation of the gas turbine. Purging the fuel from the fuel manifolds, the fuel premixers, and/or passages or conduits between the fuel manifolds and fuel premixers may reduce or eliminate residual fuel that may block portions of the fuel manifold, fuel premixers, or fuel passages/conduits. Additionally, or in the alternate, residual fuel may coke (e.g., form deposits) within the fuel manifolds, fuel premixers, or fuel passages, which may reduce an efficiency of the gas turbine engine. Purging the fuel may reduce or eliminate coking of fuel in the fuel manifolds or fuel premixers. Moreover, similar interactions and wear may exist with other fluids remaining in the system when not used. For example, fluids may be corrosive to portions of the turbomachine if exposed for relatively longer periods. Also, after a shut down fluid remaining in the tubing lines may freeze the tubing lines that may damage or block proper operation of the tubing lines after a restart of the turbomachine.

Thus, the fluid may be purged from the turbomachine using a reverse purging system that pulls the fluid through the system. In accordance with present embodiments, a purge system is configured to reverse purge the fuel from the fuel manifolds and/or fuel premixers coupled to the fuel manifolds via the fuel passageways. For simplicity, embodiments of the purge system described with reference to the figures will be referred to as a purge system for purging fuel from the fuel premixers or coolant, in particular. However, it should be noted that the purge system may also purge any other fluids in the turbomachine.

Purging may correspond to substantially unregulated flows through the turbomachine. Regardless, a purge may cause considerable disruption to operation of the turbomachine when excess fluid (e.g., fuel or coolant) is pushed through the system. Thus, the current disclosure discusses reversing flow of the fluid in a purge. Additionally or alternatively, the reverse purge at least flows the fluid in some direction other than a path used to conduct the fluid during operation. For example, the fluid may be diverted to a purge path that is not used by the fluid during operation but becomes available during a purge.

Figure 1:
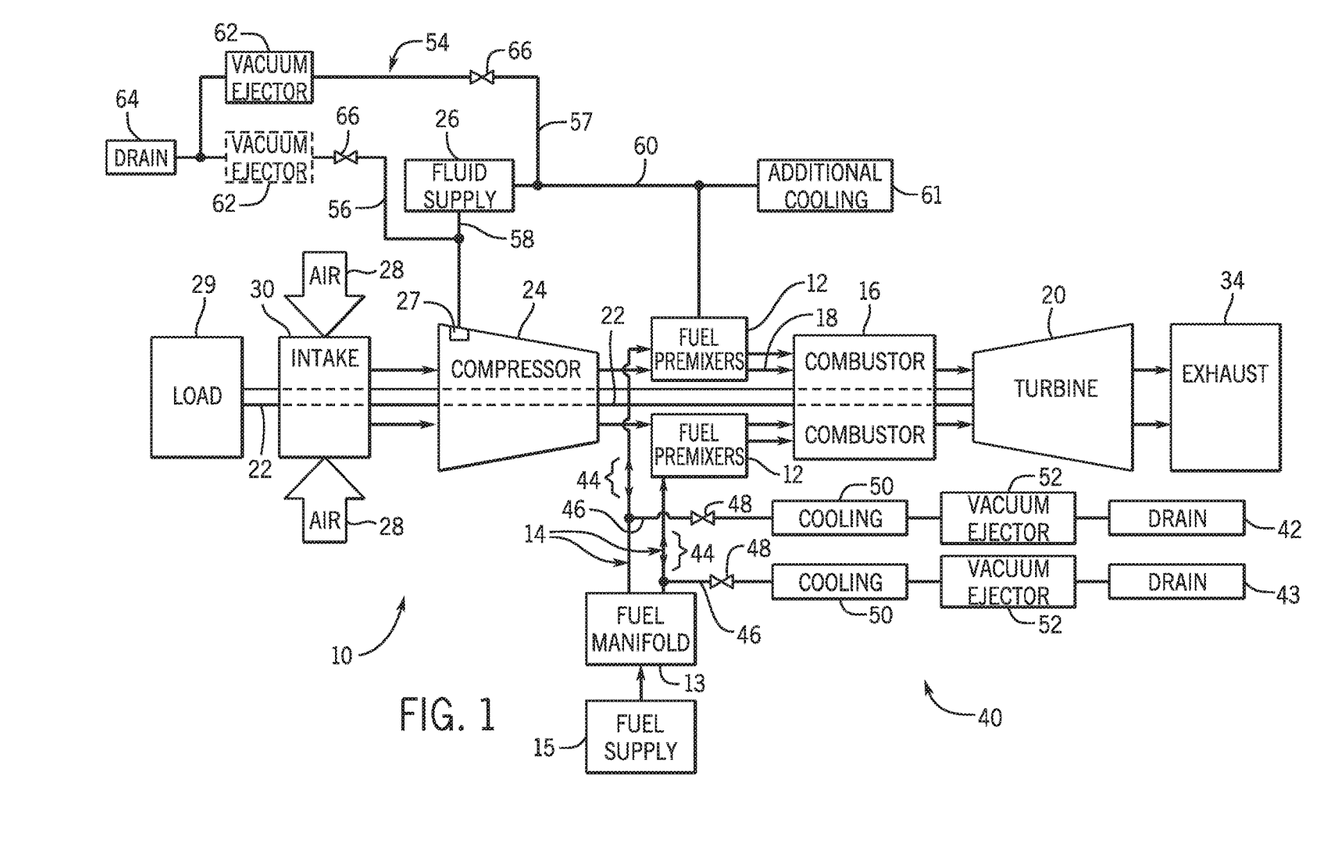
FIG. 1 is a schematic view illustrating an embodiment of a turbomachine in accordance with present embodiments.

Turning now to the drawings and referring first to FIG. 1, a block diagram of an embodiment of a turbomachine 10 (e.g., a gas turbine engine) is illustrated. It should be noted that the present disclosure may relate to any turbomachine system, and that the turbomachine 10 discussed herein does not limit the scope by which the present disclosure applies. A turbomachine system may relate to any system that involves the transfer of energy between a rotor and a fluid, or vice versa, and the illustrated turbomachine 10 is only meant to serve as a representation of an embodiment of a turbomachine system.

The illustrated turbomachine 10 includes, among other features, fuel premixers 12, fuel manifolds 13, fuel passageways 14, a fuel supply 15, and combustors 16. The turbomachine 10 may be a dual fuel turbomachine 10, where multiple fuel manifolds 13 supply, via fuel passageways 14, various types of fuel to the fuel premixers 12. For simplicity, only one fuel manifold 13 and fuel supply 15 (and associated fuel passageways 14) is shown, but it should be understood that the illustrated turbomachine 10 may include multiple manifolds 13, each being configured to deliver a different type of fuel through respective fuel passageways 14 to the premixers 12. For example, one type of fuel may be used for ignition (e.g., during a startup mode) and another type of fuel may be used for steady state operation of the turbomachine 10. In some embodiments, a single manifold 13 and/or a single premixer 12 may be employed with a single combustor 16.

As depicted, the fuel premixers 12 route the fuel (or, in the illustrated embodiment, an air-fuel mixture 18) into the combustors 16. For example, the fuel premixers 12 may initially route a mixture 18 of pilot fuel and air into the combustors 16 to start the combustion process (e.g., for an ignition process and/or startup mode), in accordance with the description above. The fuel premixers 12 may then route a mixture 18 of burn fuel and compressed air into the combustors 16 to continue the combustion process (e.g., for a burn process).

In some embodiments, as described above, the fuel premixers 12 mix the fuel (e.g., received from the fuel passageways 14 extending between the fuel manifold 13 and the premixers 12) with compressed air to form an air-fuel mixture 18 for delivery to the combustors 16. The air-fuel mixture 18 may include pilot fuel or burn fuel, depending on the stage of combustion (e.g., ignition process or steady-state burn process). The combustors 16 may then combust the mixture 18 to generate combustion products, which are passed to a turbine 20. The combustion products expand through blades or stages of the turbine 20, causing the blades of the turbine 20 to rotate. A coupling between the blades of the turbine 20 and a shaft 22 of the turbomachine 10 will cause the shaft 22 to rotate with the blades. The shaft 22 is also coupled to several other components throughout the turbomachine 10, as illustrated, such that rotation of the shaft 22 causes rotation of the components coupled to the shaft 22. For example, the illustrated shaft 22 is drivingly coupled to a compressor 24 (which may supply the air for the air-fuel mixture 18). Although a single compressor 24 may be illustrated, the compressor 24 may be a compressor system that includes 2 or more compressors. Some of the compressors 24 may be used to compress air at a relatively low pressure while other compressors 24 may be used to compress air at relatively high pressure to provide additional pressure that may be used for other purposes (e.g., intercooling).

The compressor 24 may also receive an atomized fluid spray from a fluid supply 26. For example, coolant (e.g., water) may be atomized and sprayed through spray nozzles 27 into the compressor 24 to reduce the temperature of ambient air received through an air supply 28 taken into the compressor 24. By reducing the temperature of incoming ambient air, a discharge temperature of the compressor 24 may be reduced thereby increasing power output and efficiency of the turbomachine 10. Also, fluid (e.g., water) may be injected into any other part (e.g., fuel premixers 12, combustor 16, exhaust 34, etc.) of the turbomachine 10 to reduce temperatures and/or increase efficiency in certain states of operation.

The shaft 22 is also coupled to a load 29. As appreciated, the load 29 may be any suitable device that may generate power via the rotational output of the turbomachine 10, such as an electrical generator of a power generation plant or a vehicle.

As noted above, an air supply 28 may provide air to an air intake 30, which then routes the air into the compressor 24. Indeed, in some embodiments, the air supply 28 may be ambient air surrounding the turbomachine 10. Additionally or alternatively, the air supply 28 may include an oxidant, such as oxygen. As noted above, some embodiments of the turbomachine 10 may include nozzles 27 for spraying fluid coolant sprayed into the intaken air. The compressor 24 includes a plurality of blades drivingly coupled to the shaft 22. When the shaft 22 rotates as a result of the expansion of the exhaust gases (e.g., combustion products) within the turbine 20, the shaft 22 causes the blades of the compressor 24 to rotate, which compresses the air supplied to the compressor 24 by the air intake 30 to generate compressed air. The compressed air is routed to the fuel premixers 12 for mixing with the fuel to generate the air-fuel mixture 18, which is then routed to the combustors 16. For example, the fuel premixers 12 may mix the compressed air from the compressor 24 and the fuel from one of the fuel manifolds 13 to produce the air/fuel mixture 18, as previously described. After passing through the turbine 20, the exhaust gases exit the system at an exhaust outlet 34.

As previously described, fluid may remain in the turbomachine 10 after a fluid pathway in the turbomachine 10 is no longer in use. Thus, the turbomachine 10 may include fluid removal systems that removes excess fluid from the turbomachine 10.

For example, the fluid removal may remove residual fuel that may be left in the fuel manifolds 13 or the fuel premixers 12 after the fuel is delivered to the combustors 16. For example, in dual fuel systems, the pilot fuel may be delivered to the combustors 16 via the fuel premixers 12. It may be beneficial to clear the fuel premixers 12 of the residual fuel left in the fuel premixers 12 after fuel delivery is complete, before combustion occurs in the combustor 16, or before and/or after burn fuel is routed from a different (or the same) fuel manifold 13 to the fuel premixers 12, as previously described, for delivery to the combustors 16. Thus, in accordance with the present disclosure, the turbomachine 10 includes a fuel purge system 40 configured to purge residual fuel from the fuel premixers 12 to a drain 42 or drain 43, such that the residual fuel may be removed from the turbomachine 10. In some embodiments, the contents of the drains 42 and 43 (e.g., purged fuel) may be used for other purposes or reused in the turbomachine 10.

In the illustrated embodiment, the fuel purge system 40 includes bi-directional purge segments 44 (e.g., of the fuel passageways 14) into discharge lines 46 extending from the bi-directional purge segments 44 in the fuel passageways 14 to drains 42 and 43. Each bi-directional purge segment 44 (e.g., of the corresponding fuel passageway 14) is also configured to receive, during fuel purge, purged fuel from the fuel premixer 12 in a second direction opposite to the first direction. For example, as previously described, the fuel purge mode may be utilized between startup (e.g., ignition) mode and steady state mode of the turbomachine 10, or at any other desirable time.

During the fuel purge mode, pressure urges the fuel through the fuel premixers 12 to purge residual fuel from the premixers 12 and into the bi-directional purge segments 44. As discussed below, this pressure may be positive pressure that feeds forward through the system as a positive purge or may be a relatively negative pressure exerted to pull the fuel through the discharge lines 46 than push the fuel through the discharge lines 46. Access to the discharge lines may be controlled by flow regulation devices (e.g., valves) located at a joint between the discharge lines and the bi-directional purge segments 44 that are configured to direct the purged fuel and compressed air into the discharge lines 46. Additionally or alternatively, flow regulation devices 48 disposed on the discharge lines 46 downstream of the joints may be configured to enable the purged fuel and/or air to enter and/or travel through the discharge lines 46. In other words, pressure configured to urge residual fuel through (and out of) the fuel premixers 12, through the bi-directional purge segments 44 of the fuel passageways 14, and into the discharge line 46 (e.g., via the flow regulation devices 48). Thus, the fuel purge system 40 may purge the fuel premixers 12 and portions of the fuel passageways 14 (e.g., conduits, hoses, etc.). It should be noted that the flow regulation devices 48 may be valves configured to selectively restrict flow (e.g., to increase pressure) into and through the discharge lines 46 and/or control access to the discharge lines.

It should be noted that, in some embodiments, minimanifolds may be disposed upstream of the fuel premixers 12, and may also be purged by the purge system 40. Further still, in some embodiments, the bi-directional purge segment 44 of the fuel passageway 14 may extend the entire length of the passageway 14 between the fuel manifold 13 and the fuel premixer 12, enabling purging of the entire fuel passageway 14 and, in some embodiments, the fuel manifold 13 itself. The presently disclosed purge system 40 is configured to purge residual fuel in any portion or component of the fuel manifolds 13, the fuel premixers 12, and/or the fuel passageways 14. Indeed, in some embodiments, the fuel purge system 40 may additionally purge residual, unburned fuel (and/or other residual matter, such as flash residue, pollutants, etc.) from the combustors 16. Further, one of ordinary skill in the art would recognize that presently disclosed embodiments of the fuel purge system 40 may be employed in a dual fuel turbomachine 10 or a single fuel turbomachine 10, as fuel manifolds 13 and fuel premixers 12 may be susceptible to coking of residual fuel in either configuration.

The residual fuel is discharged from the fuel premixers 12. The purged fuel is routed through discharge line(s) 46. However, the fuel may have increased in temperature in the fuel premixers 12 and/or fuel lines due to heat from the combustor 16 and/or the compressor 24. Thus, a cooling apparatus 52 that may be used to cool the fuel may be employed. The cooling apparatus may include air-cooled or liquid-cooled cooling. For example, coolant from the fluid supply 26 may be used to surround the discharge lines 46 to reduce fuel temperature. Additionally or alternatively, the cooling apparatus 52 may include air cooling. For example, the cooling apparatus 52 may include an eductor-based cooling system used to pull outside air to cool the fuel using pressure of the fuel flow through the discharge lines 46.

In some embodiments, the flow of fuel through the discharge lines 46 may be at least partially invoked by vacuum ejectors 52 using relatively negative pressure to suck the fuel through the discharge lines 46. In other words, the pressure in the discharge lines 46 on the drain-side of the ejector 52 is lower than pressure in the discharge lines 46 on the cooling-side of the ejector 52. Returning to FIG. 1, in addition or alternative to the ejectors 52, the fuel may also be urged through the discharge lines 46 using compressed pushing the fuel through the discharge lines 46. For example, the compressed air may be air bled off from the compressor 24 rather than directed to the combustor 16. However, this pressurized air may have an increased temperature that increases fuel temperature.

Continuing with FIG. 1, the turbomachine 10 also includes a coolant purging system 54. The coolant purging system 54 includes coolant discharge lines 56 and 57 that diverts fluid in fluid lines 58 and 60, respectively. Furthermore, as previously discussed, coolant from the fluid supply 26 may be provided to multiple locations in the turbomachine 10, such as the compressor 24 and/or as additional cooling 61. Moreover, the turbomachine 10 may include more than two coolant discharge lines 56 and 57 and/or fluid lines 58 and 60. Furthermore, some fluid lines may be relatively high pressure, such as the fluid line 58 that provides pressure to atomize the fluid from the fluid supply when sprayed into the air 28 as the air is intaken into the turbomachine 10. Other lines, however, may have relatively low pressure, such as the fluid line 60. For example, if coolant is used to cool the fuel discharge lines 46 or additional cooling 61, the coolant fluid may be used in a relatively low-pressure form. These high pressure and low-pressure lines may be treated differently. For example, in a high-pressure line such as fluid line 58, the fluid flow in the reverse direction may at least be partially instigated as backflow resulting from a relatively low pressure at one end of the high-pressure line and may omit or include a vacuum ejector 62 to reduce pressure in the line at an end near a drain 64 to induce movement toward the drain 64 when the ejector 62 is active. The coolant purging system 54 also includes flow regulation devices 66 disposed on the discharge lines 58 and 60 fluid and/or air to enter and/or travel through the discharge lines 58 and 60. Additionally or alternatively, the flow regulation devices 66 may regulate an amount of flow through the fluid discharge lines 58 and 60.

In some embodiments, the coolant fluid in the fluid discharge lines 58 and 60 may be reused by passing the fluid through the drain 64 back into the fluid supply 26. In some embodiments, the fluid passing through the drain 64 may first be filtered to remove particulates or other contaminants from the fluid before the fluid is passed to the fluid supply 26.

Figure 2:
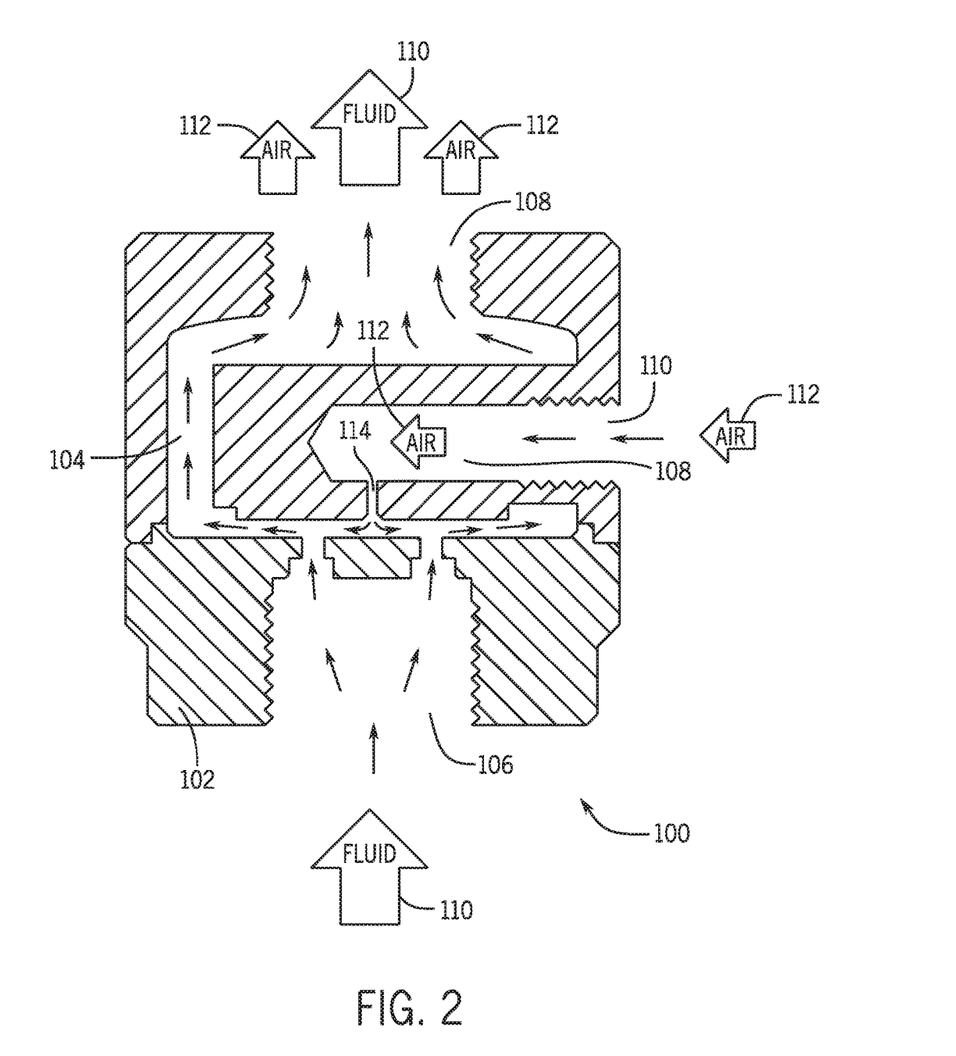
FIG. 2 is a cross-sectional view of an embodiment of a vacuum ejector or eductors, for use in the turbomachine of FIG. 1.

FIG. 2 illustrates a cross-sectional view of an embodiment of a vacuum ejector 100 that may be used in the fuel purging system 40 and/or the coolant purging system 54. The vacuum ejector 100 includes a body 102 that includes a cavity 104 that substantially-annularly extends through the body 102 of the ejector 100. The cavity 104 connects an input orifice 106 and an output orifice 108 that receives and expels fluid 110 (e.g., fuel), respectively. The cavity 104 also receives an intake of air 112 into the middle of the annular ring through a lateral orifice 112 that provides impetus to urge flow of the fluid 110 from the input orifice 106 to the output orifice 108. As previously discussed, the flow of air 112 maybe received from the compressor 24 and/or an alternative air supply that provides pressurized air for inducing flow through the vacuum ejector 100. Therefore, the vacuum ejector 100 reduces relative pressure in fluid lines at an end of the lines coupled to the vacuum ejector 100 to cause the fluid 110 to flow toward the vacuum ejector 100 through the fluid lines 110. In other words, the vacuum ejector 100 pulls fluid 110 through the fluid lines without pushing additional fluid through the turbomachine 10.

Figure 3:
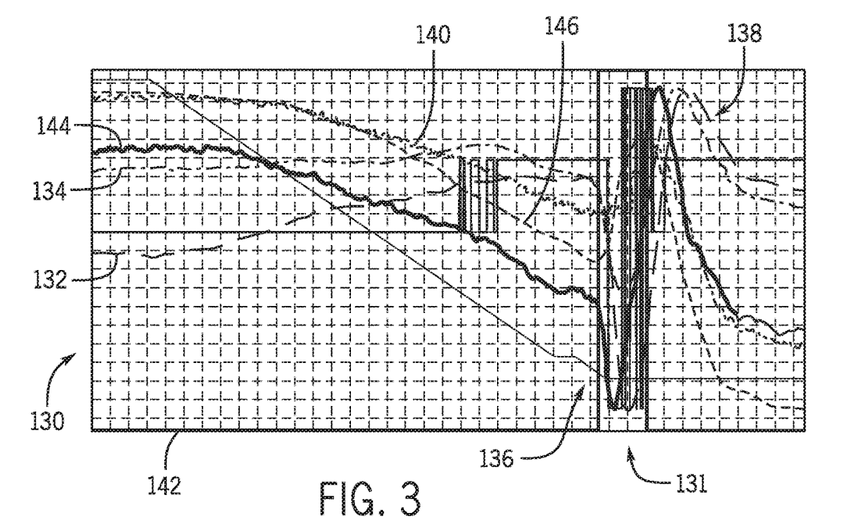
FIG. 3 illustrates an embodiment of a graph representing function of the turbomachine of FIG. 1 during a purge.

FIG. 3 illustrates a graph 130 representing function of the turbomachine 10 during operation over time. Specifically, the graph 130 shows a fluid purge occurring during a ramp down sequence for the turbomachine 10. Furthermore, as illustrated, the fluid purge corresponds to a water purge causes an interference period 131 with operation of the ramp down sequence although purges of other fluids (e.g., fuel) may cause different interference patterns. The graph 130 includes temperatures 132 and 134 that may be tracked at various locations in the gas turbine such as at the compressor 24, the combustor 16, and/or the exhaust outlet 34. During the purge and the corresponding interference period 131 on the graph 130, the temperatures 132 and 134 both drop 136 as fluctuations from a previous temperature attributable to the purge. These temperatures may fluctuate differently from each other. For example, temperature 132 may drop by a first value (e.g., 30° F.), and the temperature 134 may drop by a second value (e.g., 30° F.). Once the temperatures have dropped, an attempt to correct for the drop 136 results in an overshoot 138. For example, the temperatures 132 and 134 may overshoot a target temperature by 10-15° F.

The graph 130 also illustrates a created power 140 exerted on the shaft 22. As expected, the power 140 decreases in response to an initiation of a ramp down at time 142. However, the purge causes the power to spike in the interference period 131. For example, the power spike may correspond to an abrupt increase in power by a relatively large amount, such as 1.9 MW. The purge also causes a fluctuation of revolutions per minute (RPM) 144 of the turbomachine 10. For example, the purge may cause an increase of speed by 200 RPM. In some embodiments, at least part of these fluctuations may be attributed to increases flow of fluid being purged through the turbomachine 10. For example, fuel flow and/or fuel concentration 146 may be increased when fuel is purged through the system.

Regardless of the fluid being purged, a purge results in a somewhat uncontrolled flow of the fluid interrupting operation in the interference period 131. Furthermore, this interference causes various fluctuations in the turbomachine 10. These fluctuations may also correspond to various secondary effects, such as audible noise, vibrations, and increased wear on part of turbomachine 10. Thus, sustained operation is improved if the interference period 131 and/or the magnitude of interference can be reduced or eliminated. The period of interference may be "softened" using software sequencing. For example, the purge initiation may be delayed to give the manifolds time to drain into the engine at a "soft" rate. However, after some period of delay, additional delay adds no more benefit. For example, after 60 seconds there was no continued gain. Furthermore, some amount of fluid may remain in the system no matter the period of delay due to a vacuum condition that exists at a nozzle tip used to spray the fluid into the system from the fluid supply. Thus, a delay in the purge may result in a reduction of magnitude of and timing of an overall interference with the system but not a removal of the interference with operation of the system.

Figure 4:
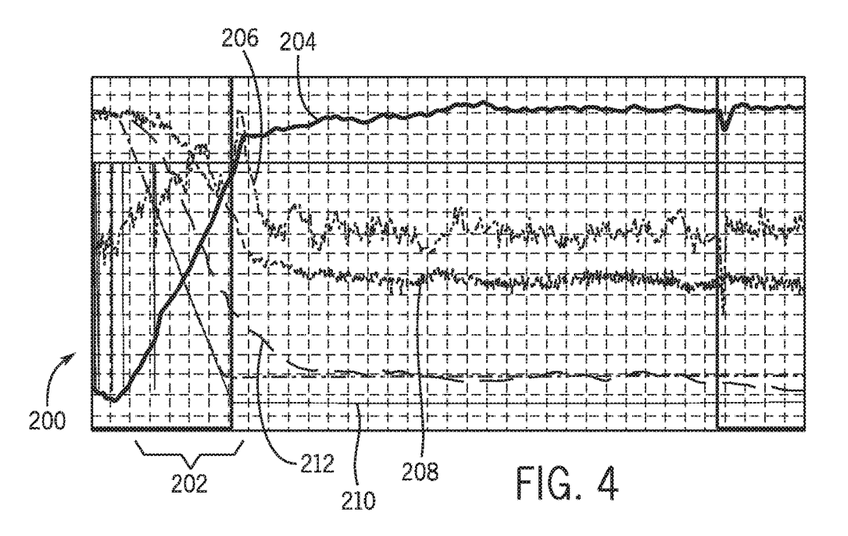
FIG. 4 illustrates an embodiment of a graph representing function of the turbomachine of FIG. 1 during a reverse purge.

Additionally or alternatively, an orifice used to spray the fluid into the system may be reduced in size to reduce flow of the fluid into the system during the purge. However, the reduced orifice does not address the vacuum condition on the nozzle. As discussed above, to remove the fluid from the system, a reverse purge that pulls fluid back through the system may overcome the vacuum condition on the fluid nozzle using the turbomachine 10 discussed above. FIG. 4 illustrates a graph 200 that illustrates operation of the turbomachine 10 using a reverse purge. The graph 200 includes a purge period that has reduced or completely nonexistence disturbance of operation. For example, temperature 204 and 206 (corresponding to temperatures 132 and 134, respectively) in FIG. 4 fluctuate much less than the corresponding temperatures 132 and 134 in FIG. 3. Similarly, power 208, RPM 210, and fuel flow concentration 212 have no disruption or at least significantly less disruption during a reverse purge 202 than experienced during a corresponding forward purge illustrated in FIG. 3.

Figure 5:
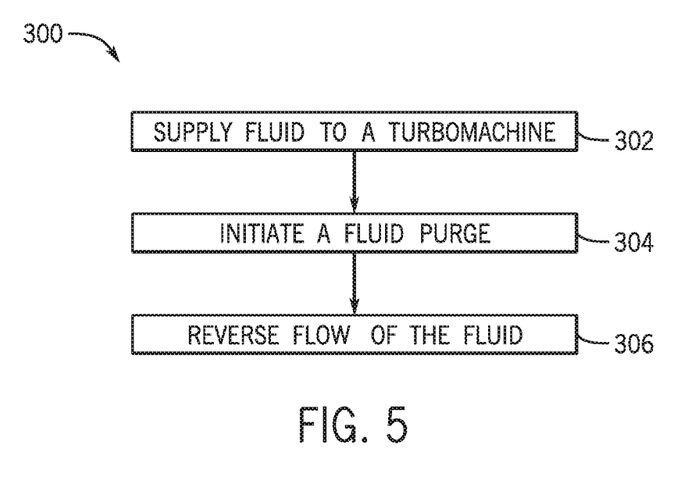
FIG. 5 is a process flow diagram illustrating an embodiment of a method for purging fluid from the turbomachine of FIG. 1.

FIG. 5 illustrates a process 300 for purging fluid from a turbomachine, such as a gas turbine. During operation of the gas turbine, fluid is supplied to the turbomachine in a first direction using one or more fluid lines (block 302). The fluid may include fuel, coolant, or any other fluid that may be flowed through the turbomachine to enable or enhance operation of the turbomachine. A purge is initiated (block 304). The purge may correspond to a ramp down, shut down, or other changes in operation of the turbomachine. For example, if the fuel type has been switched from startup fuel to steady-state fuel, startup fuel from a fuel manifold may be purged. During the purge of the turbomachine, flow in the one or more fluid lines is reversed into a second direction. (block 306). By changing direction of flow, a vacuum condition that forms at a nozzle used to spray the fluid may be overcome and fluid may be more completely expunged from the turbomachine than a forward purge. Furthermore, as previously discussed, a reverse purge reduces disruption to the turbomachine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
   one or more fluid lines configured to flow a fluid in a first direction in the gas turbine system; and
   an eductor configured to reverse flow of the fluid in the one or more fluid lines during a reverse purge of the gas turbine system, wherein the eductor comprises:
   a body;
   a cavity in the body;
   a fluid inlet coupled to the cavity, wherein the fluid inlet is coupled to the one or more fluid lines;
   a motive fluid inlet coupled to the cavity, wherein the motive fluid inlet is configured to receive a motive fluid to cause a reduced pressure to suck the fluid from the one or more fluid lines through the fluid inlet into the cavity; and
   a fluid outlet configured to discharge the fluid and the motive fluid, wherein the fluid is not a combustible fuel.

2. The gas turbine system of claim 1, wherein the fluid comprises a coolant.

3. The gas turbine system of claim 1, wherein the fluid comprises water.

4. The gas turbine system of claim 1, comprising:
   a shaft;
   a compressor coupled to the shaft;
   a turbine coupled to the shaft; and
   a combustor configured to combust a fuel to generate combustion products to drive the turbine.

5. The gas turbine system of claim 1, wherein the fluid comprises a coolant that is injected into a flow path that passes through a compressor, and the coolant is configured to reduce a discharge temperature of the compressor.

6. The gas turbine system of claim 5, wherein the coolant comprises water.

7. The gas turbine system of claim 5, comprising one or more spray nozzles coupled to the one or more fluid lines, wherein the one or more spray nozzles are configured to spray the coolant into the flow path.

8. The gas turbine system of claim 1, wherein the motive fluid is different from the fluid.

9. A gas turbine system, comprising:
   a compressor;
   one or more fluid lines configured to flow a fluid in a first direction into a flow path that passes through the compressor; and
   an eductor configured to reverse flow of the fluid in the one or more fluid lines during a reverse purge of the gas turbine system, wherein the eductor comprises:
   a body;
   a cavity in the body;
   a fluid inlet coupled to the cavity, wherein the fluid inlet is coupled to the one or more fluid lines;
   a motive fluid inlet coupled to the cavity, wherein the motive fluid inlet is configured to receive a motive fluid to cause a reduced pressure to suck the fluid from the one or more fluid lines through the fluid inlet into the cavity; and
   a fluid outlet configured to discharge the fluid and the motive fluid, wherein the fluid is different from the motive fluid.

10. The gas turbine system of claim 9, wherein the fluid is not a combustible fuel.

11. The gas turbine system of claim 9, wherein the fluid comprises water.

12. The gas turbine system of claim 11, comprising one or more spray nozzles coupled to the one or more fluid lines, wherein the one or more spray nozzles are configured to spray the water into the flow path.

13. The gas turbine system of claim 9, comprising a turbine and a combustor, wherein the combustor is configured to receive a discharge flow from the compressor and combust a fuel to generate combustion products, and the turbine is driven by the combustion products.

14. The gas turbine system of claim 13, wherein the motive fluid comprises a compressed fluid extracted from the compressor.

15. The gas turbine system of claim 13, wherein the motive fluid comprises a compressed fluid obtained from a supply separate from the compressor.

16. A method comprising
   supplying fluid to a gas turbine system using one or more fluid lines in a first direction during operation of the gas turbine system; and
   purging the fluid from the one or more fluid lines using an eductor to reverse flow from the first direction to a second direction, wherein purging the fluid comprises:
   receiving a motive fluid through a motive fluid inlet into a cavity of the eductor to cause a reduced pressure to suck the fluid from the one or more fluid lines through a fluid inlet into the cavity; and
   discharging the fluid and the motive fluid through a fluid outlet of the eductor, wherein the fluid is not a combustible fuel.

17. The method of claim 16, wherein the fluid comprises water.

18. The method of claim 16, wherein supplying fluid to the gas turbine comprises spraying the fluid using a nozzle.

19. The method of claim 18, wherein spraying the fluid comprises cooling a compressible fluid being compressed by a compressor of the gas turbine system.

20. The method of claim 16, wherein the motive fluid is different from the fluid.

* * * * *